United States Patent
Blackmon et al.

(10) Patent No.: US 12,111,419 B1
(45) Date of Patent: Oct. 8, 2024

(54) SYSTEMS AND METHODS FOR DETECTING OBJECTS

(71) Applicant: Board of Trustees of the University of Alabama, for and on behalf of the University of Alabama in Huntsville, Huntsville, AL (US)

(72) Inventors: James B. Blackmon, Brownsboro, AL (US); Steven R. Peeples, Madison, AL (US)

(73) Assignee: Board of Trustees of The University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 0 days.

(21) Appl. No.: 16/912,423

(22) Filed: Jun. 25, 2020

Related U.S. Application Data (60) Provisional application No. 62/866,200, filed on Jun. 25, 2019, provisional application No. 62/866,444, filed on Jun. 25, 2019, provisional application No. 62/866,439, filed on Jun. 25, 2019, provisional application No. 62/866,425, filed on Jun. 25, 2019.

(51) Int. Cl.
  *G01S 7/41* (2006.01)
  *G01S 13/75* (2006.01)
  *G01S 13/88* (2006.01)
  *G01S 13/87* (2006.01)

(52) U.S. Cl.
  CPC ............ *G01S 7/415* (2013.01); *G01S 13/753* (2013.01); *G01S 13/887* (2013.01); *G01S 13/872* (2013.01)

(58) Field of Classification Search
  CPC ...... G01S 7/415; G01S 13/753; G01S 13/887; G01S 13/872
  See application file for complete search history.

(56) References Cited

U.S. PATENT DOCUMENTS

| | | |
|---|---|---|
| 3,832,709 A | 8/1974 | Klein et al. |
| 4,476,459 A | 10/1984 | Cooper et al. |
| 4,484,193 A | 11/1984 | Bellew |
| 4,490,718 A | 12/1984 | Opitz et al. |
| 4,641,137 A | 2/1987 | Opitz et al. |
| 4,673,940 A | 6/1987 | Barley et al. |
| 4,897,660 A | 1/1990 | Gold et al. |

(Continued)

*Primary Examiner* — Timothy A Brainard
*Assistant Examiner* — Ismaaeel A. Siddiquee
(74) *Attorney, Agent, or Firm* — Butler Snow LLP; Jon E. Holland (57) ABSTRACT

A system for using wireless signals to detect objects of a certain type, such as concealed weapons, leverages the fact that different objects have different resonance characteristics. The system transmits wireless signals of different frequencies, and returns from such signals are measured. The return of a signal from an object at a resonant frequency of the object will be stronger than a return of a signal from the object at a non-resonant frequency. The system analyzes the returns in an effort to determine when a return is sufficiently large to indicate that it was reflected from an object of interest. When an object of interest is detected, the system adjusts a characteristic of the system, such as antenna orientation or pulse shape, based on an estimated location of the object, and then runs a test to confirm the detection of the object, thereby eliminating at least some false positives.

27 Claims, 5 Drawing Sheets

(56) References Cited

U.S. PATENT DOCUMENTS

| | | | |
|---|---|---|---|
| 5,073,780 A | 12/1991 | Barley et al. | |
| 5,473,332 A * | 12/1995 | James | G01S 7/2813 |
| | | | 342/99 |
| 5,745,071 A * | 4/1998 | Blackmon, Jr. | G01S 13/878 |
| | | | 342/463 |
| 6,204,813 B1 * | 3/2001 | Wadell | G01S 5/0205 |
| | | | 342/463 |
| 7,768,444 B1 * | 8/2010 | Rourk | G01S 13/887 |
| | | | 342/13 |
| 7,994,962 B1 * | 8/2011 | Ben-Shmuel | H01Q 19/18 |
| | | | 342/13 |
| 2009/0021417 A1 * | 1/2009 | Margaliot | G01V 3/12 |
| | | | 342/22 |
| 2010/0079280 A1 * | 4/2010 | Lacaze | G01V 3/08 |
| | | | 340/6.1 |
| 2017/0139043 A1 * | 5/2017 | Takada | G01S 7/412 |
| 2020/0341135 A1 * | 10/2020 | Jiang | H04W 64/006 |

* cited by examiner

SYSTEMS AND METHODS FOR DETECTING OBJECTS

CROSS REFERENCE TO RELATED APPLICATIONS

This application claims priority to U.S. Provisional Application No. 62/866,200, entitled "Systems and Methods for Detecting Objects" and filed on Jun. 25, 2019, which is incorporated herein by reference. This application claims priority to U.S. Provisional Application No. 62/866,425, entitled "Systems and Methods for Efficient and Reliable Detection of Objects with Wireless Signals" and filed on Jun. 25, 2019, which is incorporated herein by reference. This application claims priority to U.S. Provisional Application No. 62/866,439, entitled "Systems and Methods for Using Wireless Signals to Detect Objects" and filed on Jun. 25, 2019, which is incorporated herein by reference. This application claims priority to U.S. Provisional Application No. 62/866,444, entitled "Systems and Methods for Wirelessly Detecting Remote Objects" and filed on Jun. 25, 2019, which is incorporated herein by reference.

RELATED ART

There are many applications for which it is desirable to detect a presence of a specific object. As an example, in a military application, it may be desirable to detect the presence of an enemy soldier, a tank, or a missile that may be threatening a specific target. Although there are many military applications for which object detection is useful, there is also a limitless number of other non-military applications.

Many systems have been developed to detect objects by sending a probe signal and measuring returns of the probe signal in an attempt to identify a pattern or signature that matches an object of interest. As an example, radar systems have been used extensively to find certain targets, such as aircraft. However, the probe signals typically reflect from many different types of objects making it difficult to identify returns from an object of interest. Indeed, ground clutter often makes radar useless for trying to find specific objects near the earth's surface.

A system developed by the inventor leverages the fact that different objects have different resonance characteristics in order to distinguish returns from different types of objects. Such a system is described by U.S. Pat. No. 5,745,071, entitled "Method and Apparatus for Precisely Locating a Resonant Object" and filed on Mar. 10, 1997, which is incorporated herein by reference. In such system, signals of different frequencies are wirelessly transmitted into the surrounding environment, and returns from such signals are measured. The return of a signal from an object at a resonant frequency of the object will be stronger than a return of a signal from the object at a non-resonant frequency. The system analyzes the returns in an effort to determine when a return is sufficiently large to indicate that it was reflected from an object of interest. When such a return is identified, the system determines that the object of interest has been detected. Further, based on the signal delay and other factors, the system can estimate a location of the object.

In theory, the aforementioned system enables detection of a specific object when it is in close proximity to or concealed by other types of objects that have different resonant frequency characteristics. However, when the specific object of interest is in fact in close proximity to or concealed by many other objects, such as trees, buildings, people, etc., the system can detect a significant amount of noise from energy that is reflecting from such other objects. Filtering such noise and deciphering the returns to identify objects of interest without a significant number of false positives can be challenging, thereby degrading the system's performance in many real-world situations. Improved techniques for communicating and analyzing signals, such as those described by U.S. Pat. No. 5,745,071, to detect objects are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
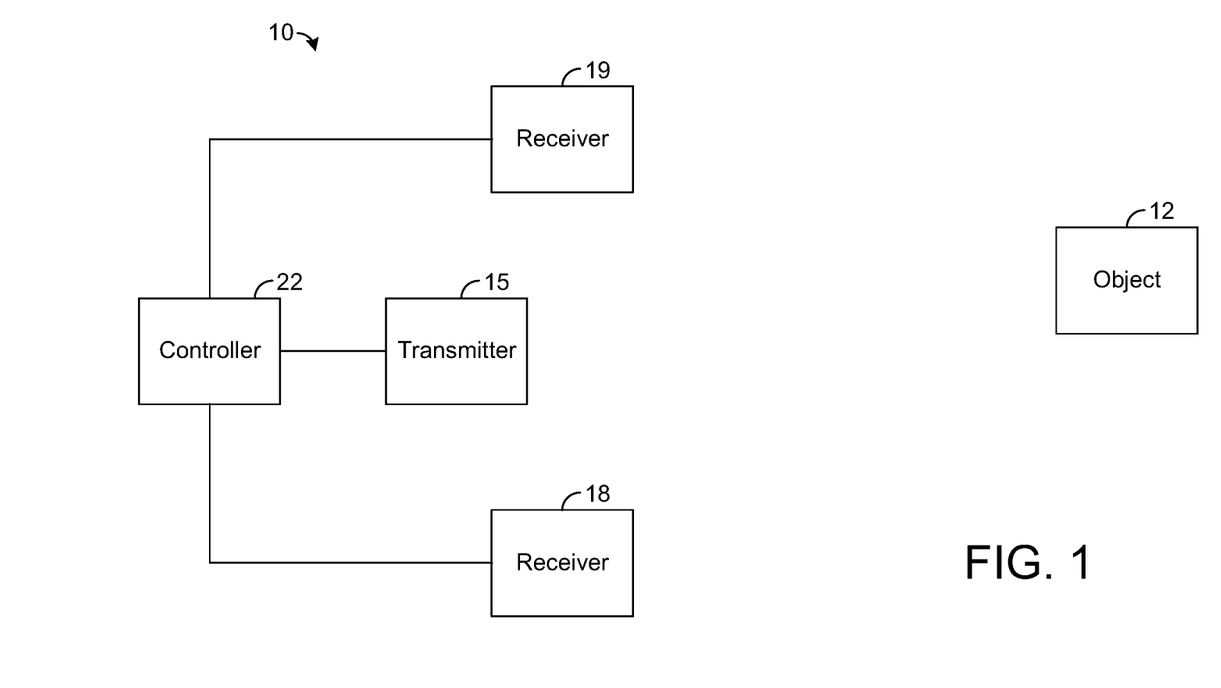
FIG. 1 is a block diagram illustrating an embodiment of a system for detecting an object of a specific type.

The present disclosure generally pertains to systems and methods for detecting objects. FIG. 1 depicts an exemplary embodiment of a system 10 for detecting specific objects 12 of interest. As an example, in a military application, the system 10 may be used to detect the presence of an enemy soldier, a tank, or a missile that may be threatening a specific target. In order to combat terrorism, the system 10 may be used to detect, within a crowd, a person who is wearing an explosive vest or carrying a weapon that is being concealed from view. The system also may be used to detect an animal of a certain type as in various livestock situations, population studies, etc. There are many other applications for which the system 10 may be used to detect certain objects.

In the embodiment shown by FIG. 1, the system 10 comprises at least one transmitter 15 and at least two receivers 18, 19 that are spaced apart to facilitate determination of a location of an object 12 of interest. The transmitter 15 is configured to wirelessly transmit pulses in at least two channels separated by frequency. The first channel is centered at the resonant frequency of the object 12 of interest, and the transmitter 15 transmits a pulse at the resonant frequency. The second channel is centered at a non-resonant frequency of the object 12 of interest, and the transmitter 15 transmits a pulse at this non-resonant frequency. In some embodiments, the pulses are transmitted as relatively high power pulses of radio frequency (RF) energy. Further, FIG. 1 depicts a single transmitter for simplicity of illustration, but any number of transmitters may be used to transmit the pulses described herein.

Note that for illustrative purposes, it is assumed that each receiver 18, 19 has its own antenna (not specifically shown in FIG. 1) for receiving signals. It is possible, however, for a single antenna to be used if desired. Further, the same antenna may be used to both transmit pulses and receive returns, especially for short pulse lengths relative to long distances to the target of interest, or with special circuits. In addition, any receiver 18, 19 and/or the transmitter 15 may have multiple antennas if desired.

In a preferred embodiment, the non-resonant frequency is preferably close to the resonant frequency in an effort to better suppress clutter. Comparisons of returns of pulses at the resonant frequency to the pulses at the non-resonant frequency enable the system 10 to detect the presence of the object 12 of interest, while eliminating so-called clutter objects as will be described in more detail below. In addition, the pulse transmitted at the resonant frequency is preferably a narrowband pulse. In this regard, decreasing the width of the pulse helps to reduce the likelihood the pulse will cause objects not of interest with different resonant frequencies to resonate and thus provide a strong return, which could result in the detection of a false positive.

Note that the system 10 can be configured to transmit and receive any number of channels. Indeed, to detect many different types of objects, the system 10 may be configured to transmit at a frequency corresponding to a resonant frequency of each type of object 12 to be detected. In addition, the system 10 may be configured to transmit pulses at additional non-resonant frequencies, which can help to eliminate clutter. However, for simplicity of illustration, the system 10 will be described hereafter as transmitting at just two frequencies, a non-resonant frequency and a resonant frequency for the object 12 to be detected, unless otherwise indicated.

Each receiver 18, 19 may be configured to detect returns from pulses at the resonant frequency and returns from pulses at the non-resonant frequency. As an example, each receiver 18, 19 may be a tunable receiver that can be tuned to the resonant frequency when a pulse at the resonant frequency is being transmitted and can be tuned to the non-resonant frequency when a pulse at the non-resonant frequency is being transmitted.

As shown by FIG. 1, the transmitter 15 and the receivers 18, 19 are electrically coupled to a controller 22, which is configured to compare the pulses received by the receivers 18, 19. In this regard, if the return at the resonant frequency is significantly larger than the return at the non-resonant frequency, the controller 22 may detect a presence of the object 12 of interest. In this regard, a pulse at the resonant frequency of the object 12 will cause the object 12 to resonate such that the return from such pulse will be stronger than a return from a pulse that does not cause the object 12 to resonate. Thus, a stronger return at the resonant frequency relative to a return at the non-resonant frequency indicates that the stronger return has reflected from an object 12 of interest that resonates in response to the return's pulse.

There are various techniques that may be used by the controller 22 to determine when a return at the resonant frequency is strong enough to indicate that it has been reflected from an object 12 of interest. In one embodiment, the controller 22 may receive from a given receiver 18, 19 a first value indicative of an amplitude (e.g., power) of a return at the resonant frequency for a given delay, and the controller 22 may receive from the same receiver 18, 19 a second value indicative of the amplitude (i.e., power) of a return at the non-resonant frequency for the same delay. Note that "delay" of a return as used herein generally refers to the time of transmission of the return's pulse by the transmitter 15 to the time that the return is received by the receiver 18, 19 that measures the return. This delay corresponds to the time for the pulse to travel to an object and reflect back to the receiver. In any event, after determining the first value and the second value discussed above, the controller 22 may subtract the second value from the first value and determine whether this difference is greater than a predefined threshold. If so, the controller 22 may detect a presence of the object 12 of interest. If not, the controller 22 may determine that an object 12 of interest is not indicated by the returns. The presence of clutter objects can be subtracted by this means, the details of which are described further below. A clutter object, such as a vehicle, etc., will often have approximately the same return for the resonant and non-resonant frequency that are used to more clearly identify the object of interest 12. There are other algorithms, the details of which are described further below, but, for this case, subtracting the non-resonant return signal from the resonant return signal will essentially eliminate that type of clutter object. The remaining signal difference will thus clearly show the presence of the object of interest 12. However, there are other details for clutter and background elimination that are described below. This brief description is provided to give a summary of one basic capability for discrimination that is generally unavailable in conventional radars.

Once an object 12 of interest has been detected, the controller 22 may then determine the object's location. In this regard, when the controller 22 detects a presence of an object 12 of interest based on a peak in the returns at the resonant frequency received by the receiver 18, the controller 22 may estimate a distance of the object 12 from that same receiver 18 based on the delay associated with the peak. As noted above, this delay corresponds to the amount of time between transmission of the pulse by the transmitter 15 and reception of the peak by the receiver 18. Using this delay, the controller 22 may estimate the distance of the object 12 from the receiver 18. In this regard, the total distance of travel is generally equal to the speed of the pulse multiplied by the delay. If the transmitter 15 and receiver 18 are about the same distance from the object 12, then the distance from the receiver 18 to the object 12 is about half of the total distance of travel.

The controller 22 may similarly detect a peak representing the same object in the returns received by the receiver 19 and, using the same techniques described above for the receiver 19, estimate a distance of the object 12 from the receiver 19. Using these two distances, the controller 22 may estimate the location of the object 12 in two dimensions. In addition, based on the angle of the returns in addition to the delays, the controller 22 may estimate the location of the object in three dimensions. The system 10 may also include additional receivers (not shown) to facilitate estimation of the object's location. For example, with three receivers, triangulation or trilateration may be used to estimate the object's location in three dimensions.

Moreover, techniques for estimating location are also described in more detail in U.S. Pat. No. 5,745,071. In some embodiments, using delay times to give distances, as described above, and using triangulation or trilateration principles (essentially, the Pythagorean expression), the location of the object of interest 12 can be determined, typically to within a distance error approximated by the wavelength, for commercially available off-the-shelf hardware, also further described in following sections.

Note that the presence of an object 12 of interest may be detected using a single receiver 18 or 19. However, use of multiple receivers at different locations allows the location to be determined in two dimensions or three dimension using the location estimation techniques described herein. It should also be noted that it is possible for at least one receiver 18, 19 to be co-located with the transmitter 15 and, if desired, share an antenna with the transmitter 15. A device that includes both a transmitter and receiver is sometimes referred to in the art as a "transceiver."

Also note that the object's location may be used as a factor in improving the performance of the system in a variety of ways as will be discussed in more detail below. One such use of the object's location is for selecting the threshold to be used for detecting the presence of an object 12. In this regard, as described above, a value indicative of a difference in the power of a pulse at the resonant frequency and the power of a pulse at the non-resonant frequency may be compared to a predefined threshold to detect a presence of an object 12. In addition, signals are attenuated as they travel through space, and it is, therefore, expected that the power of the returns should decrease with the distance from the transmitter 15 of the object that reflected the returns. In some embodiments, the controller 22 is configured to select the threshold to be used based on the delay associated with the returns being compared. As an example, lower thresholds may be used for returns associated with greater delay (i.e., returns that have been reflected from an object that is further from the transmitter 15). The thresholds may be algorithmically calculated based on delay, or the controller 22 may store a plurality of thresholds, each of which is associated with a respective delay. When a comparison is to be performed, the controller 22 may retrieve the threshold associated with the appropriate delay (i.e., the delay matching the actual delay for the returns being compared) and use this threshold in the comparison. If desired, the controller 22 may interpolate between two or more stored thresholds if the actual delay does not precisely match the delay associated with a stored threshold. Various other techniques for determining the desired threshold to be used for a comparison are possible. In addition, the thresholds may be based on other factors, such as for example the gain characteristics of the transmitter's antenna 71.

Figure 2:
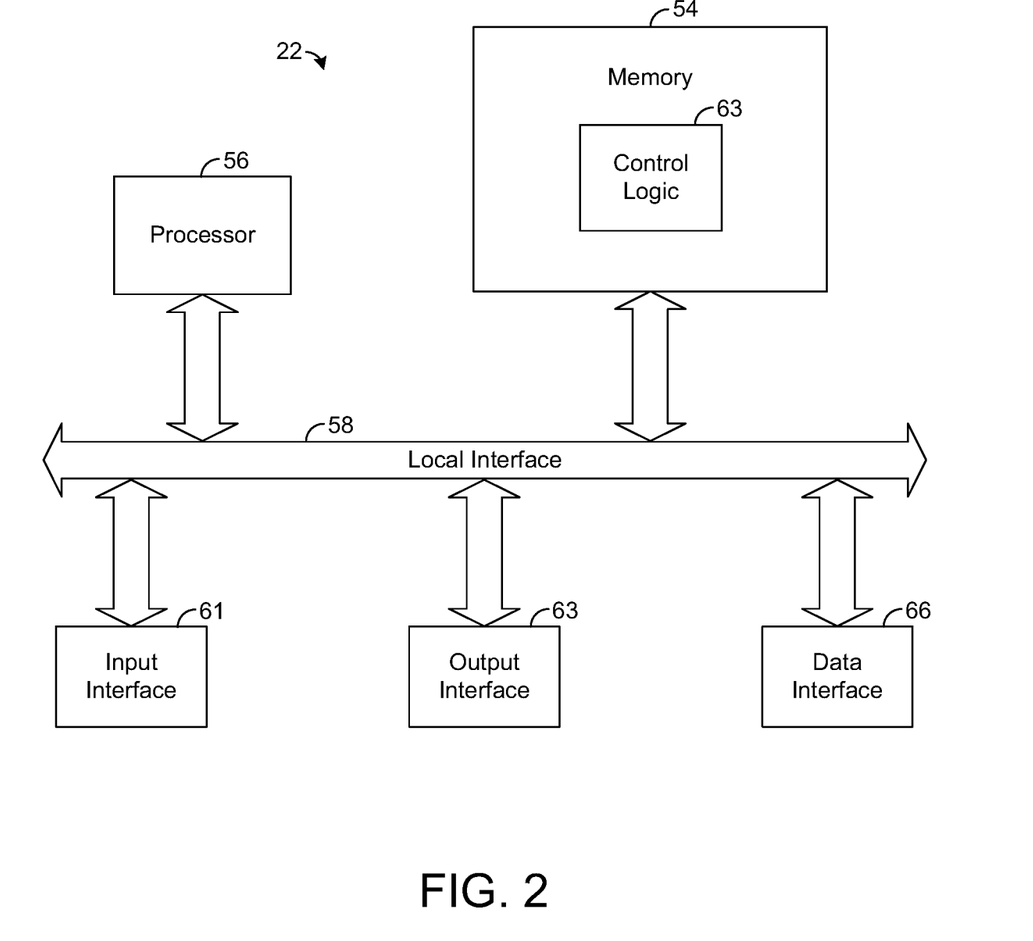
FIG. 2 is a block diagram illustrating an embodiment of a controller, such as is depicted by FIG. 1.

FIG. 2 depicts an exemplary embodiment of the controller 22. As shown by FIG. 2, the controller 22 comprises control logic 52 for generally controlling the operation of the controller 22, including implementing an algorithm for detecting an object 12 and locating the object 12, as described in more detail herein. The control logic 52 can be implemented in software, hardware, firmware or any combination thereof. In the exemplary controller 22 illustrated by FIG. 2, the control logic 52 is implemented in software and stored in memory 54 of the controller 22.

Note that the control logic 52, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary controller 22 depicted by FIG. 2 comprises at least one conventional processor 56, such as a digital signal processor (DSP) or a central processing unit (CPU), that communicates to and drives the other elements within the server 33 via a local interface 58, which can include at least one bus. As an example, when the control logic 52 is implemented in software, the processor 56 may be configured to execute instructions of the control logic 52 during operation. Furthermore, an input interface 61, for example, a keyboard or a mouse, can be used to input data from a user of the controller 22, and an output interface 63, for example, a printer, monitor, liquid crystal display (LCD), or other display apparatus, can be used to output data to the user. Further, a data interface 66 may be coupled to other components of the system 10, such as the transmitter 15 and receivers 18, 19, and used to exchange data or signals with such other components.

Note that there are a variety of techniques that can be used to improve the results of the system 10. In some embodiments, the controller 22 is configured to average power values before performing a comparison, as described above. As an example, the controller 22 may average three (or some other number) power values consecutively measured by the receiver 18 for returns at the resonant frequency to provide a first averaged power value, and the controller 22 may average three (or some other number) power values consecutively measured by the receiver 19 for returns at the non-resonant frequency to provide a second averaged power value. Then, the controller 22 may subtract the second averaged power value from the first averaged power value. If this difference exceeds a predefined threshold, then the controller 22 may detect a presence of the object 12 of interest, as described above. Averaging the power values can avoid a phase effect that can result in negative values from the subtraction. Such averaging can help to prevent negative numbers resulting from the power subtraction operations described herein where fluctuations in instantaneous power due to phase changes may cause the instantaneous power of a return at the resonant frequency to briefly fall below the instantaneous power of a return at the non-resonant frequency for a given delay.

A simplified embodiment has been described above in an effort to facilitate an understanding of certain concepts of the disclosure. In practice, the system 10 may transmit many pulses at different frequencies for each sample taken by the system 10. Further, for assessing whether a particular object is detected, returns from different non-resonating frequencies may be subtracted from a return of the pulse at the resonating frequency in order to remove clutter and improve the results of the system 10. With some number of such frequencies to either side of the central resonant frequency, such as about 5 to 10, for example, the characteristic resonant plot can be seen and compared with earlier calibration plots of the object 12 of interest. Such objects 12 can include weapons (e.g., rifles, RPGs, missiles, etc.), IEDs, explosive vests, Explosively Penetrating Objects, or non-weapon objects. In addition to more precisely discriminating the object of interest, the use of additional non-resonant frequencies that are close to the central frequency will provide better clutter elimination, thus minimizing "false positives".

Figure 3:
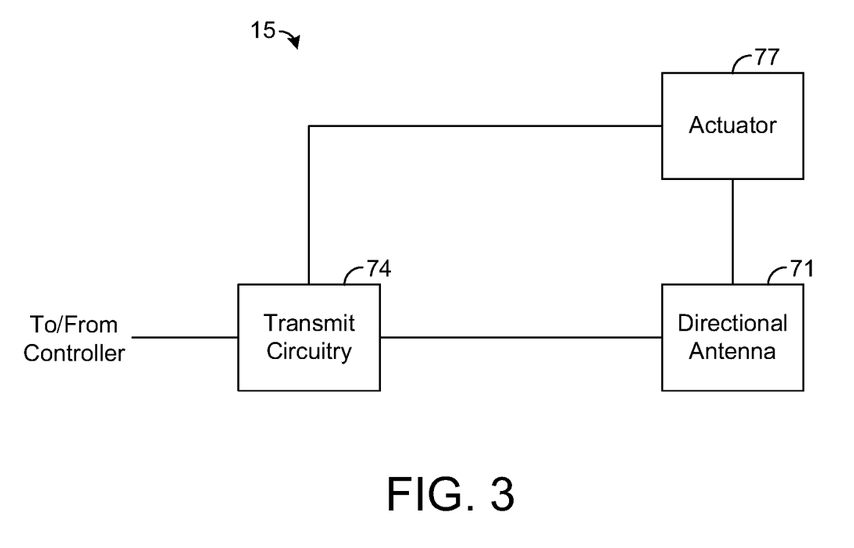
FIG. 3 is block diagram illustrating an embodiment of a transmitter, such as is depicted by FIG. 1.

FIG. 3 depicts an exemplary embodiment of the transmitter 15. As shown by FIG. 3, the transmitter 15 has a high-gain directional antenna 71 coupled to transmit circuitry 74 that is configured to generate pulses and wirelessly transmit the pulses from the directional antenna 71, although other types of antennas may be used in other embodiments. The antenna 71 may be designed to provide a high signal-to-noise ratio (SNR) and low standing wave ratio for efficient transmission and low internal loss. In some embodiments, each pulse is sinusoidal (e.g., characterized as a sinusoid having fixed frequency set to either the resonant frequency of an object of interest or a non-resonant frequency depending on the type of pulse being transmitted), though other types of pulses are possible. The transmit circuitry 74 may receive instructions from the controller 22 and transmit pulses in accordance with such instructions, such that the controller 22 controls the timing and frequency of each transmitted pulse. The transmit circuitry 74 may be implemented in hardware or any combination of hardware, software, and firmware. As an example, the transmit circuitry 74 may include any number of processors for controlling the transmitter 15 as described herein. Such processors may be configured to execute software or firmware. In some embodiments, at least some of the functionality of the transmit circuitry 74 may be implemented in hardware, such as a field programmable gate array (FPGA), though other configurations of the transmit circuitry 74 are possible. In addition, the transmit circuitry 74 may have circuit components, such as filters and amplifiers, for processing and shaping the pulses to be transmitted, including controlling the frequency and power of the transmitted pulses.

The antenna 71 is "directional" in that it transmits at higher powers in a certain direction or range of directions such that its transmission range in a certain direction or range of directions is greater relative to other directions. Directional antennas are generally well-known in the art, and this characteristic may be controlled by controlling the shape of the antenna 71 as well as through the use of shields that may block the transmitted pulse in certain directions. The antenna 71 is generally referred to herein as being "directed" to an object when it is oriented such that the antenna's direction of highest transmission power is toward the object.

As shown by FIG. 3, the transmitter 15 has an actuator 77 that is configured to move the directional antenna 71 to change its orientation. As an example, the actuator 77 may be configured to rotate the antenna 71 so that the transmission range in a given direction is increased or decreased, as may be desired. The actuator 77 may operate under the control of the transmit circuitry 74 so that the transmit circuitry 74 can control the orientation of the antenna 71.

Figure 4:
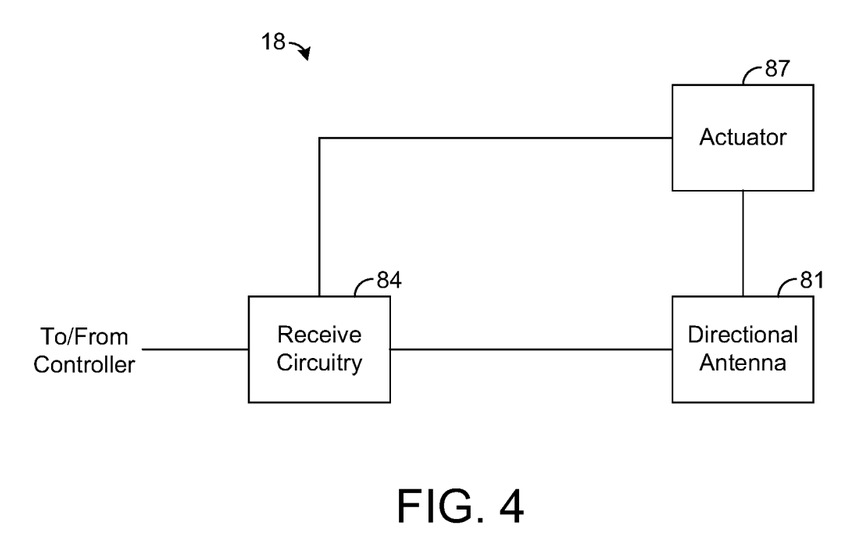
FIG. 4 is a block diagram illustrating an embodiment of a receiver, such as is depicted by FIG. 1.

FIG. 4 depicts an exemplary embodiment of the receiver 18. Note that the receiver 19 may be configured the same or similar to the receiver 18 shown by FIG. 4. As shown by FIG. 4, the receiver 18 has a directional antenna 81 coupled to receive circuitry 84 that is configured to process wireless signals received by the antenna 81. The receive circuitry 84 may be implemented in hardware or any combination of hardware, software, and firmware. As an example, the receive circuitry 84 may include any number of processors for controlling the receiver 18 as described herein. Such processors may be configured to execute software or firmware. In some embodiments, at least some of the functionality of the receive circuitry 84 may be implemented in hardware, such as a field programmable gate array (FPGA), though other configurations of the receive circuitry 84 are possible. In addition, the receive circuitry 84 may have circuit components, such as filters and amplifiers, for processing and shaping the received signals.

The antenna 81 is "directional" in that it has greater sensitivity in a certain direction or range of directions such that its reception range in a certain direction or range of directions is greater. Directional antennas are generally well-known in the art, and this characteristic may be controlled by controlling the shape of the antenna 81 as well as through the use of shields or reflectors (e.g., dishes) that may respectively block or reflect signals propagating toward the antenna 81 from certain directions. The antenna 81 is generally referred to herein as being "directed" to an object when it is oriented such that the antenna's direction of highest sensitivity is toward the object. This directional nature of the antenna 81 enables the receiver 18 to achieve a higher signal-to-noise ratio (SNR) for returns from the region to which the antenna 81 is directed by reducing noise and, in particular, clutter from other regions.

As shown by FIG. 4, the receiver 18 has an actuator 87 that is configured to move the directional antenna 81 to change its orientation. As an example, the actuator 87 may be configured to rotate the antenna 81 so that the reception range in a given direction is increased or decreased, as may be desired. The actuator 87 may operate under the control of the receive circuitry 84 so that the receive circuitry 84 can control the orientation of the antenna 81.

As noted above, it is unnecessary for at least one of the receivers 18, 19 to have its own antenna. As an example, one of the receivers 18, 19 may be co-located with the transmitter 15 and use the transmitter's antenna 71 for reception of signals. Further, any of the transmitter 15 or receivers 18, 19 may use multiple antennas. For example, it is possible for the transmitter's antenna 71 to comprise a vertically-polarized antenna and a horizontally-polarized antenna that are oriented orthogonally with respect to each other for transmitting a dual-polarized pulse. Various types of known antennas may be used by the transmitter 15 and receivers 18, 19.

As also noted above, the controller 22 may be configured to detect an object 12 of interest by comparing a threshold to a value indicative of a comparison of returns at the resonant frequency to returns at the non-resonant frequency. Selection of this threshold affects the accuracy at which the controller 22 detects objects 12. In this regard, increasing the threshold generally has the effect of reducing false positives but also increasing the likelihood that the controller 22 may miss one or more objects 12 of interest. Decreasing the threshold generally has the effect of reducing the likelihood that the controller 22 will miss one or more objects 12 of interest but also increasing false positives. The threshold should be selected to be an optimum value that balances these considerations based on the various design parameters, including transmission power, receiver sensitivity, and desired range.

In some embodiments, the controller 22 is configured to control the orientation of one or more antennas based on an analysis of the returns in an effort to improve performance and, in particular, accuracy of the object detections. In this regard, when the controller 22 detects a potential object 12 of interest, the controller 22 is configured to estimate the object's location based on the timing of the returns. For example, as described above, the controller 22 may be configured to estimate the distance of an object from each receiver 18, 19 based on the delay for a pulse to travel to and then return from the object 12 to the respective receiver 18, 19. Using these distances, the controller 22 can calculate the object's location (using triangulation, trilateration, or some other technique for determining location). After estimating the object's location, the controller 22 may control the orientation of the receiver antennas to direct them toward the object's estimated location. The controller 22 may also control the orientation of the transmitter antenna to similarly direct it toward the object's location. Controlling the orientations of the antennas in this manner may improve SNR to provide a more reliable determination about whether a presence of the object 12 has indeed been detected. In addition, this technique also may diminish the return signal power of clutter objects.

Figure 5:
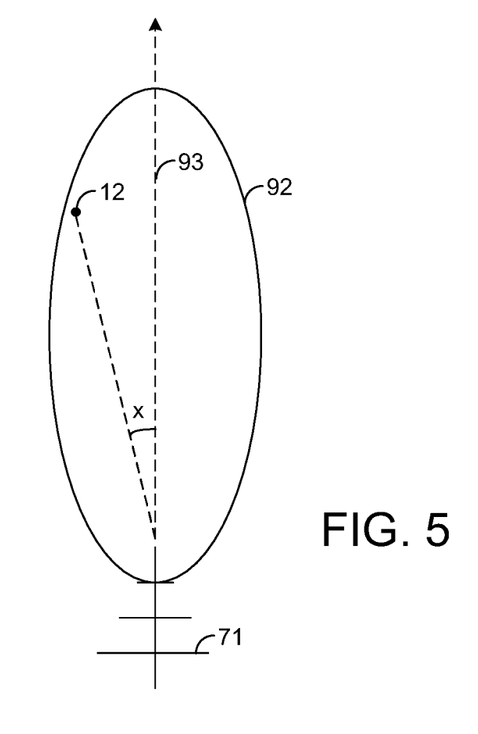
FIG. 5 depicts an exemplary main mode of a transmitter, such as is depicted by FIG. 1.

In some embodiments, multiple thresholds may be used where at least one threshold is used to find suspected objects 12 of interest (also referred to herein as "targets") and at least one other threshold is used to confirm the presence of an object 12 after an antenna is moved or the pulses are adjusted. In this regard, refer to FIG. 5, which shows a directional antenna 71 of the transmitter 15 having a main lobe 92. In FIG. 5, the direction of transmission with the highest power by the transmitter 15 is along arrow 93, referred to hereafter as "maximum power direction" or "MP direction." Assume that the target 12 is within the main lobe 92 but at some angle x from the MP direction. In general, the receive power of returns from the target 12 is inversely related to x. That is, the power of the returns generally decreases for greater angles of x.

As noted above, accurate detection of the target 12 may be affected by noise. For example, a large object close to the target 12 may reflect a relatively high amount of radiation that appears as noise or clutter in the measurements even if the large object does not resonate in response to transmitted pulses. Such noise may reduce the difference between the power measured at the resonant frequency for the target 12 and the power measured for at least one non-resonant frequency. Thus, the effects of the noise may make it difficult to detect the target 12, particularly when the antenna 71 is not directed to the target 12, as shown by FIG. 5.

In one embodiment, the controller 22 uses at least two thresholds: an upper threshold and lower threshold. The lower threshold is selected to be less than the upper threshold and is used to detect the possible presence of the target 12. That is, if the lower threshold is exceeded, the controller 22 suspects the presence of the target 12 and then uses the upper threshold to confirm the target's presence after one or more adjustments have been made, such as after one or more antennas have been directed to the suspected target 12, as will be described in more detail below.

Figure 6:
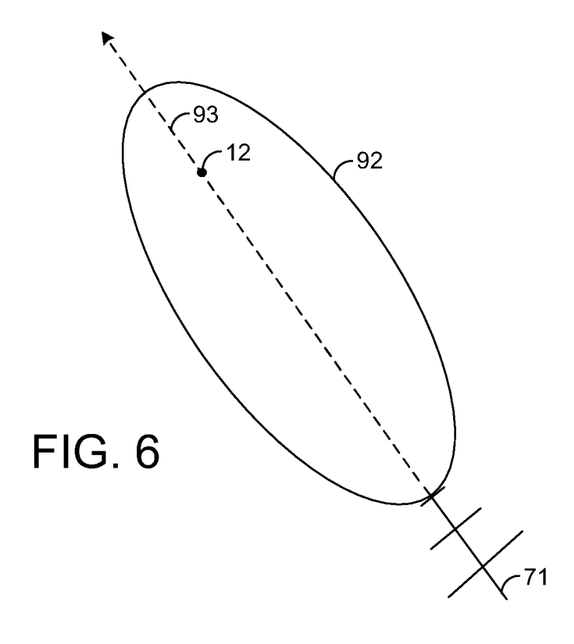
FIG. 6 depicts the main mode of the transmitter depicted by FIG. 5 after the antenna of the transmitter has been re-oriented in response to a detection of an object of interest.

In this regard, when the lower threshold is exceeded, thereby detecting the presence of a suspected target 12, the controller 22 determines the location of the suspected target 12 based on returns from the suspected target 12 using the techniques described above. Based on such location, the controller 22 then controls the orientation of one or more antennas of the receivers 18, 19 and/or transmitter 15 to be directed to the suspected target 12. As an example, referring to FIG. 6, the controller 22 instructs the transmitter 15 to rotate the antenna 71 such that this antenna 71 is substantially directed toward the suspected target 12. Thus, the power of returns from the suspected target should increase as the antenna 71 is moved to decrease x. The antennas of the receivers 18, 19 may be similarly moved so that they are substantially directed toward the suspected target 12, thereby increasing their sensitivities for returns from the suspected target 12. Orientating the antennas of the transmitter 15 and/or receivers 18, 19 in this manner generally increases SNR so that a higher threshold may be used to confirm the target's presence.

After the antennas of the transmitter 15 and/or receivers 18, 19 are re-orientated based on the estimated location of the suspected target 15, additional measurements are taken and compared to the upper threshold. If the upper threshold is exceeded, then the controller 22 is configured to confirm the presence of the target 12 and provide an indication that the target 12 has been detected. As noted above, such indication may include the calculated location of the target 12.

In some embodiments, the transmitter antenna 71 may be rotated in order to change the polarization of the pulses. In this regard, the polarization of the pulses may affect the power of the measured returns. For example, if the object to be detected is a cylindrical object, such as a rifle or a missile, then stronger returns may be realized when the polarization of the pulses are better aligned with the orientation of the rifle or missile. In this regard, if the rifle is oriented vertically, then stronger returns may be realized if the incident waveform is vertically polarized. On the other hand, if the rifle is oriented horizontally, then stronger returns may be realized if the incident waveform is horizontally polarized. Thus, depending on the orientation of the target 12, stronger returns from the target 12 may be realized by rotating the one or more antennas in order to change the polarization of the pulses used to detect the target 12.

In some embodiments, when the controller 22 detects a suspected target 12, the controller 22 is configured to control one or more antennas (e.g., an antenna of the transmitter 15) in order to change the polarization of the returns detected by the receivers 18, 19. It is generally expected that such change in the polarization will cause the power at the resonant frequency to fluctuate. The controller 22 is configured to store the power measurements of the returns at the resonant frequency and to identify a maximum in such power values, which presumably occurs when the polarization of the measured returns are best aligned with the target 12. The controller 22 may then use such identified power value to confirm the presence of the target 12. As an example, the controller 22 may subtract the measurement of at least one return at the non-resonant frequency from the identified power value and compare the difference to a threshold to determine whether the target 12 is present.

In the foregoing embodiment, polarization of the pulses is varied by moving (e.g., rotating) one or more antennas. In some embodiments, the horizontal component of a pulse may be transmitted by one antenna, referred to as a "horizontally-polarized antenna," and the vertical component of the pulse may be transmitted by another antenna, referred to as a "vertically-polarized antenna," such as an antenna oriented orthogonally relative to the horizontally-polarized antenna. In such an embodiment, both antennas may be moved in unison such that they remain in an orthogonal orientation. However, moving antennas to change the polarization of the pulses is unnecessary. As an example, one set (where a "set" is at least one antenna) of antennas may be used to transmit a pulse of one polarization and another set of antennas may be used to transmit a pulse of a different polarization. The system 10 may have any number of antennas to transmit any number of pulse polarizations as may be desired.

In some embodiments, changing the polarization of the pulses may be used to determine the orientation of the target 12 being detected. As an example, the controller 22 may be configured to change the polarization of the pulses transmitted at the resonant frequency, such as by rotating a vertically-polarized antenna and a horizontally-polarized antenna used to transmit the pulses, and identify which of the returns of these pulses have maximum power. The polarization angle for the pulses that produce the maximum-power returns corresponds to the orientation angle of the target 12, and the controller 22 may use such polarization angle to determine the orientation of the target 12. As an example, the controller 22 may assume that a cylindrical target 12, such as a rifle or missile, is oriented at the polarization angle that provides returns of maximum power. In other embodiments, other techniques for determining the orientation of the target 12 based on the polarization of the pulses are possible.

In some embodiments, once a possible target 12 is detected, the controller 22 may be configured to use the estimated location of the target 12 to adjust the transmitted pulse for optimizing confirmation of the target 12. As an example, the controller 22 may be configured to control the transmitter 15 such that the power and/or duration of the transmitted pulses are changed based on the estimated location of the suspected target 12. In this regard, as known in the art, the power of a transmitted signal generally decreases with distance. Further, for detection of an object 12 at a certain distance, there may be an optimal power range and/or duration of a pulse for detection or confirmation of the object 12. Thus, when a potential target is detected, the controller 22 may be configured to control the transmitter 15 to alter the shape (e.g., peak power and/or duration) of the transmitted pulses, and then analyze the returns of these altered pulses to confirm a presence of the target 12. By tailoring the shape of the pulses to the distance of the suspected target 12, a better SNR may be achieved, thereby improving the system's accuracy in confirming the target 12.

Note that the controller 22 may be configured to vary the pulses transmitted by the transmitter 15 for other reasons in other embodiments. As an example, the controller 22 may control the transmitter 15 to vary the duration of the pulses according to a certain sequence or pattern that can be used to help identify returns of the pulses. Specifically, returns that exhibit the transmitted pattern may be identified by the controller 22 as from the transmitter 15 as opposed to an interferer that may generate random noise in the frequency range of the pulses.

Also note that some complex objects may be associated with multiple resonant frequencies that produce strong returns. As an example, a target 12 may have multiple components, each of which has a different resonant frequency. That is, the target 12 of interest may exhibit a signature of resonant frequencies that can be used to detect the target 12 with a higher accuracy relative to the use of a single resonant frequency. In such an embodiment, for each sample, the controller 22 may be configured to control the transmitter 15 to transmit a pulse at each resonant frequency associated with the target 12 to be detected. For each such pulse, the controller 22 may be configured to compare returns of the pulse to the returns of at least one pulse at a non-resonant frequency as described above to determine whether such comparison is indicative of the target 12. If the comparisons for all of the associated resonant frequencies (or if at least a certain minimum number of these comparisons) indicates a presence of the target 12 according to the techniques described above, then the controller 22 may be configured to confirm the presence of the target 12. Otherwise, the controller 22 may determine that the comparison are not indicative of the target 12.

Figure 7:
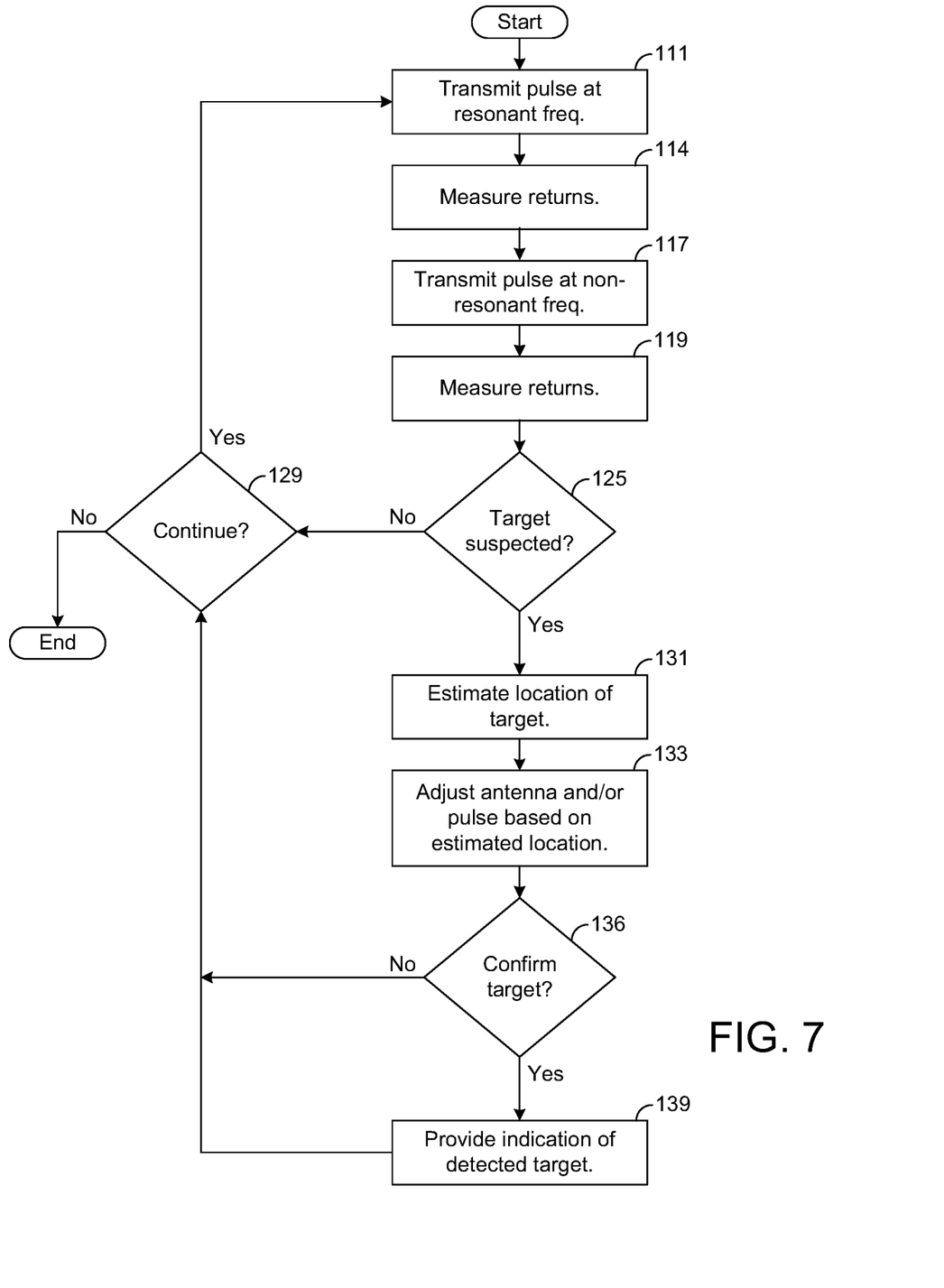
FIG. 7 is a flowchart illustrating an exemplary operation of a system, such as is depicted by FIG. 1, for detecting an object of a specific type.

An exemplary use and operation of the system 10 will be described in more detail below with particular reference to FIG. 7.

In block 111, the controller 22 controls the transmitter 15 such that it transmits a pulse at the resonant frequency of an object 12 to be detected. In block 114, returns of this pulse are measured by receivers 18, 19 over time. In block 117, the controller 22 controls the transmitter 15 such that it transmits a pulse at a non-resonant frequency (e.g., different but preferably close to the resonant frequency). In block 119, returns of this pulse are measured by receivers 18, 19 over time. Note that blocks 117 and 119 may be repeated as desired to provide measurements at other non-resonant frequencies, as described above. However, for simplicity of illustration, it will be assumed that a pulse at only one non-resonant frequency is transmitted in block 117. In addition, as also described above, blocks 111, 114, 117, and 119 may be repeated any number of times. In addition, if desired, the measurements in block 114 may be averaged or otherwise combined so that each compared power value represents an average or otherwise combined (e.g., accumulated) power measurement, and the measurements in block 117 may be averaged or otherwise combined so that each compared power value represents an average otherwise combined (e.g., accumulated) power measurement In block 125, the controller 22 is configured to analyze the returns measured in blocks 114 and 119 to determine whether a possible target 12 is detected. The analysis is performed to identify an instance when the measured return of the pulse at the resonant frequency is sufficiently high, after accounting for radiation returned from clutter objects, to indicate a possible presence of a target 12. In some embodiments, this may be performed by comparing measurements of the returns of a pulse at the resonant frequency to measurements of the returns of a pulse at the non-resonant frequency. As an example, for a given delay, the controller 22 may subtract a value indicative of the power of the return at the non-resonant frequency from a value indicative of the power of the return at the resonant frequency. The controller 22 may then compare the difference to a threshold to determine whether a suspected target 22 may be present at the corresponding distance from the receiver that measured the returns. In other embodiments, other techniques for analyzing the returns are possible.

If a possible target 12 is not detected in block 125, the controller 22 may determine whether to continue monitoring for targets 12 in block 129. If so, the controller 22 may return to block 111 and repeat the aforementioned process. However, if a suspected target 12 is detected in block 125, then the controller 22 estimates the location of the suspected target, in block 131, based on the delay of the measurements that resulted in such detection. In this regard, the controller 22 may estimate the distance of the suspected target 12 from the receiver 18 based on the delay (as measured from transmission) of the peak associated with the suspected target 12 in the measurements of the receiver 18, and the controller 22 may estimate the distance of the suspected target 12 from the receiver 19 based on the delay (as measured from transmission) of the peak associated with the suspected target 12 in the measurements of the receiver 19. Based on these distances, the controller 22 may determine the location of the suspected target 12.

In block 133, the controller 22 adjusts one or more antennas and/or characteristics (e.g., shape) of the transmitted pulses based on detection of the suspected target 22 and, in some cases, the adjustments may be based on the estimated location of the suspected target 12. As an example, the controller 22 may move one or more directional antennas 71, 81 to be substantially directed toward the estimated location of the suspected target 12. The controller 22 could also adjust the shape of the transmitted pulses, such as the peak power and/or duration of each pulse, based on the distance of the suspected target 12 from the transmitter 15. In some embodiments, the controller 22 may adjust the polarization of the pulse. As an example, in response to detection of the suspected target 12, the controller 22 may control the transmitter 15 to sweep the polarization of the pulses across a range of polarization angles and, for each polarization angle, measure the returns at the resonant frequency and the returns at the non-resonant frequency.

After adjusting the antenna and/or transmitted pulses in block 133, the controller 22 may confirm whether the suspected target 12 is indeed an instance of a target 12 detected by the system 10. In this regard, in block 136, the controller 22 may essentially repeat blocks 111, 114, 117, 119 and 125 using the adjusted antennas and/or pulses. If such process results in the detection of a target 12, then the controller 22 confirms that a target has been detected in block 136. If the target 12 is so confirmed, then the controller 22 may provide an indication of the detected target 12 in block 139.

As an example, using the output interface 63 (FIG. 2), the controller 22 may display a message indicating that a target 12 has been detected and such message may indicate the location of the target, as estimated in block 131. In other embodiments, the controller 22 may indicate detection of the target in other ways. As an example, the controller 22 may display a map of geographic region that includes the location of the target 12 and display an indication on the map at a location corresponding to the geographic location of the target 12. In other embodiments, the controller 22 may transmit a message or map, as described above, to a remote device for rendering of the message or map to a user of the remote device. Yet other techniques for providing an indication of the detected target 12 are possible in other embodiments.

Note that there are various other techniques that may be used to improve the results of the system 10 or to address problems or possible shortcomings. As an example, if the existence of clutter objects are known, it is possible to pre-process the measured returns in order to remove the clutter from these objects performing the comparisons described herein. For example, prior to operation, the system 10 may be used to measure the returns of stationary background objects in the area to be monitored, such as buildings, trees, terrain etc. The measurements of these returns, referred to hereafter as "background measurements," may be stored by the controller 22, which during operation uses these background measurements to remove clutter from the measurement of the returns. As an example, as discussed above, each sample is associated with a respective delay indicative of the amount of time for the measured pulse to travel from the transmitter 15, reflect from an object, and be received by a receiver 18, 19. For each sample measured during operation, the controller 22 may subtract the background measurement associated with same delay (indicative of clutter reflected from background objects at the same distance from the transmitter 14) from the sample (i.e., the measurement of the return occurring during operation). This subtraction has the effect of removing clutter from background objects that are not of interest, thereby helping to improve SNR of the measurement of the return.

In addition, during operation, it is possible for at least some mobile objects not of interest, such as people or automobiles, to enter the area being monitored. Such objects generally increase clutter. If the presence and location of such an object can be detected or otherwise determined, then the controller 22 may be configured to pre-process the returns in an attempt to remove clutter from these objects. As an example, the controller 22 may store predefined signatures of certain objects where each predefined signature is essentially the measurements of returns from an object of a certain type made (e.g., a human or an automobile) by the system 10 or a similar system 10 prior to operation. Such signature is affected by its distance from the transmitter as the measurements from the object will be smaller the further that the object is from the transmitter 15. If the controller 22 is aware of the presence of a clutter object of a certain type within the area being monitored, then the controller 22 may retrieve the predefined signature associated with that object type and use it cancel clutter from the object in the measurements. As an example, the controller 22 may adjust the signature to account for the clutter object's distance from the transmitter 22 and then subtract the signature from the measurements associated with the delay corresponding to the clutter object's distance from the transmitter 15, thereby removing clutter from such measurements. In other embodiments, yet other techniques may be used to improve results as may be desired.

Now, therefore, the following is claimed:

1. A system for detecting objects with wireless signals, comprising:
   at least one transmitter configured to wirelessly transmit first pulses at a resonant frequency of an object to be detected and second pulses at a frequency different than the resonant frequency;
   at least one first receiver configured to receive first returns of the first pulses and second returns of the second pulses, wherein the first pulses cause the object to be detected to resonate thereby increasing amplitudes of the first returns from the object;
   at least one second receiver configured to receive third returns of the first pulses and fourth returns of the second pulses;
   a controller configured to analyze the first returns relative to the second returns for detecting the object and estimating a first distance of the object from the at least one first receiver, the controller configured to analyze the third returns relative to the fourth returns for detecting the object and estimating a second distance of the object from the at least one second receiver, the controller further configured to determine a location of the object based on the first distance and the second distance and to adjust a directional antenna of the at least one transmitter based on the location of the object determined by the controller;
   the at least one transmitter further configured to wirelessly transmit at least one of the first pulses and at least one of the second pulses after adjusting the directional antenna, wherein at least one of the first returns is from the at least one of the first pulses transmitted after adjusting the directional antenna, and wherein at least one of the second returns is from the at least one of the second pulses transmitted after the adjusting; and
   the controller further configured to analyze the at least one of the first returns relative to the at least one of the second returns to confirm detection of the object.

2. The system of claim 1, wherein the object is a weapon.

3. The system of claim 1, wherein the controller is configured to average a plurality of power values thereby providing an averaged power value, each of the plurality of power values indicative of a power measured for a respective sample of the first returns, wherein the controller is configured to detect the object based on the averaged power value.

4. The system of claim 1, wherein the controller is configured adjust a first measurement of the at least one of the first returns based on a second measurement from one of the second returns for removing clutter from the first measurement, and wherein the controller is configured to detect the object based on the adjusted first measurement.

5. The system of claim 4, wherein the controller is configured to compare the adjusted first measurement to a threshold, and wherein the controller is configured to detect the object based on a comparison of the adjusted first measurement to the threshold.

6. The system of claim 5, wherein the controller is configured to select the threshold for comparison to the adjusted first measurement based on a delay associated with the at least one of the first returns.

7. The system of claim 1, wherein the controller is configured to move the directional antenna based on the location of the object such that the directional antenna is more directed toward the location of the object.

8. The system of claim 1, wherein the controller is configured to adjust the directional antenna to change a polarization of at least one of the first pulses transmitted from the directional antenna.

9. The system of claim 8, wherein the controller is configured to perform at least one comparison between (1) a power value measured for a sample of one the first returns from one of the first pulses having a first polarization and (2) a power value measured for a sample of one of the first returns from one of the first pulses having a second polarization, and wherein the controller is configured to determine an orientation of the object based on the at least one comparison.

10. The system of claim 1, wherein the controller is configured to adjust at least one characteristic of the at least one of the first pulses based on the location of the object.

11. The system of claim 10, wherein the at least one characteristic includes a peak power of the at least one of the first pulses.

12. The system of claim 1, wherein the controller is configured to confirm detection of the object by (1) calculating a difference between power levels of the at least one of the first returns and the at least one of the second returns and (2) determining whether the calculated difference between power levels is greater than a threshold.

13. The system of claim 12, wherein the controller is configured to provide an indication of the detected object in response to confirmation of the detection.

14. The system of claim 1, wherein the controller analyzes the returns by calculating a difference between power levels of the first returns and power levels of the second returns.

15. The system of claim 14, wherein the controller is further configured to detect the object when the difference between power levels is greater than a first threshold.

16. The system of claim 15, wherein the controller is further configured to calculate a second difference between power levels of the at least one of the first returns and the at least one of the second returns, the controller further configured to confirm detection of the object when the second difference between power levels is greater than a second threshold, the second threshold being greater than the first threshold.

17. The system of claim 1, wherein the controller is further configured to adjust at least one of the receivers based on the location of the object determined by the controller.

18. A method for detecting objects with wireless signals, comprising:
  wirelessly transmitting, with at least one transmitter, first pulses at a resonant frequency of an object to be detected and second pulses at a frequency different than the resonant frequency;
  receiving, with at least one first receiver, first returns of the first pulses and second returns of the second pulses, wherein the first pulses cause the object to resonate thereby increasing amplitudes of the first returns;
  receiving, with at least one second receiver, third returns of the first pulses and fourth returns of the second pulses;
  analyzing the first returns relative to the second returns to detect the object;
  estimating a first distance of the object from the at least one first receiver based on the detection of the object from the first returns and the second returns;
  analyzing the third returns relative to the fourth returns to detect the object;
  estimating a second distance of the object from the at least one second receiver based on the detection of the object from the third returns and the fourth returns;
  determining a location of the object based on the first distance and the second distance;
  adjusting a directional antenna of the at least one transmitter based on the determined location, wherein the wirelessly transmitting comprises wirelessly transmitting at least one of the first pulses and at least one of the second pulses after the adjusting the directional antenna, wherein at least one of the first returns is from the at least one of the first pulses transmitted after the adjusting, and wherein at least one of the second returns is from the at least one of the second pulses transmitted after the adjusting; and
  analyzing the at least one of the first returns relative to the at least one of the second returns to confirm detection of the object.

19. The method of claim 18, wherein the object is a weapon.

20. The method of claim 18, wherein the adjusting the directional antenna comprises moving the directional antenna based on the determined location of the object such that the directional antenna is more directed toward the determined location of the object.

21. The method of claim 18, further comprising adjusting at least one characteristic of the first pulses based on the determined location of the object.

22. The method of claim 18, wherein the at least one characteristic includes a peak power of the first pulses.

23. The method of claim 18, wherein the analyzing the at least one of the first returns relative to the at least one of the second returns to confirm detection of an object includes:
  calculating a difference between power levels of the at least one of the first returns and the at least one of the second returns; and
  determining whether the calculated difference between power levels is greater than a threshold.

24. The method of claim 23, further comprising displaying, with an output interface, an indication of the object in response to confirming detection of the object.

25. The method of claim 18, wherein:
  the analyzing the first returns relative to the second returns to detect the object further includes:
    adjusting first measurements of the first returns based on second measurements of the second returns, thereby removing clutter from the first measurements; and
    detecting the object based on the adjusted first measurements, wherein the detection of the object based on the adjusted first measurements is based on an increased amplitude of at least one of the first returns; and
  the analyzing the third returns relative to the fourth returns to detect the object further includes:
    adjusting third measurements of the third returns based on fourth measurements of the fourth returns, thereby removing clutter from the third measurements; and
    detecting the object based on the adjusted third measurements, wherein the detection based on the adjusted third measurements is based on an increased amplitude of at least one of the third returns.

26. The method of claim 25, further comprising comparing at least one of the adjusted first measurements to a threshold, wherein the detection is based on the comparing.

27. The method of claim 26, further comprising selecting the threshold for the comparing based on a delay associated with the at least one of the adjusted first measurements.

\* \* \* \* \*